US008583670B2

(12) United States Patent  (10) Patent No.: US 8,583,670 B2
Cameron et al.  (45) Date of Patent: Nov. 12, 2013

(54) QUERY SUGGESTIONS FOR NO RESULT WEB SEARCHES

(75) Inventors: Michael Cameron, Redmond, WA (US); Hugh Williams, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 723 days.

(21) Appl. No.: 11/867,408

(22) Filed: Oct. 4, 2007

(65) Prior Publication Data

US 2009/0094221 A1   Apr. 9, 2009

(51) Int. Cl.
*G06F 7/00* (2006.01)
*G06F 17/30* (2006.01)

(52) U.S. Cl.
USPC ........... 707/765; 707/748; 707/751; 707/766; 707/916

(58) Field of Classification Search
None
See application file for complete search history.

(56) References Cited

U.S. PATENT DOCUMENTS

| | | | |
|---|---|---|---|
| 6,169,986 B1 | 1/2001 | Bowman et al. | |
| 6,671,681 B1 | 12/2003 | Emens et al. | |
| 6,772,150 B1* | 8/2004 | Whitman et al. | 707/721 |
| 7,194,684 B1 | 3/2007 | Shazeer | |
| 7,296,019 B1* | 11/2007 | Chandrasekar et al. | 1/1 |
| 7,321,892 B2* | 1/2008 | Vadon et al. | 707/767 |
| 7,363,319 B2* | 4/2008 | Cappellini | 1/1 |
| 7,424,486 B2* | 9/2008 | Whitman et al. | 1/1 |
| 7,440,941 B1* | 10/2008 | Borkovsky et al. | 1/1 |
| 7,617,209 B2* | 11/2009 | Whitman et al. | 1/1 |
| 7,685,144 B1* | 3/2010 | Katragadda | 707/999.101 |
| 2004/0236736 A1* | 11/2004 | Whitman et al. | 707/3 |
| 2005/0222976 A1 | 10/2005 | Pfleger | |
| 2005/0234879 A1 | 10/2005 | Zeng et al. | |
| 2006/0085391 A1 | 4/2006 | Turski et al. | |
| 2006/0117003 A1 | 6/2006 | Ortega et al. | |
| 2006/0190447 A1 | 8/2006 | Harmon et al. | |
| 2006/0230035 A1 | 10/2006 | Bailey et al. | |
| 2006/0259479 A1 | 11/2006 | Dai | |
| 2007/0055652 A1 | 3/2007 | Hood et al. | |
| 2007/0156757 A1* | 7/2007 | Tang et al. | 707/104.1 |
| 2007/0175674 A1* | 8/2007 | Brinson et al. | 177/136 |
| 2008/0306935 A1* | 12/2008 | Richardson et al. | 707/5 |

OTHER PUBLICATIONS

Paul Aumer-Ryan, No Results Found "Improving Digital Library Search Tools"; http://www.ischool.utexas.edu/~paul/docs/PAR-Paper-NoResultsFound-22pp-2006.pdf; Dec. 13, 2006.

(Continued)

*Primary Examiner* — Shyue Jiunn Hwa
(74) *Attorney, Agent, or Firm* — Shook Hardy & Bacon LLP

(57) ABSTRACT

Presenting one or more suggested search-engine queries based on an initial search-engine query is described herein. Once the initial query is received, a search engine determines whether any web content is relevant thereto. If not, a query-suggestion service determines whether any suggested queries can be substituted for the initial query. If not, the query is spell-corrected, if necessary, and parsed into individual terms. Each parsed term is then checked to see whether it can be associated with alternative search terms. Terms than can are combined and their combination is also checked for alternative search terms. All of the alternative search terms are scored and then assembled into a list of suggested search terms that is presented to the user.

9 Claims, 4 Drawing Sheets

(56) References Cited

OTHER PUBLICATIONS

Rosie Jones et al., "Generating Query Substitutions", http://delivery.acm.org/10.1145/1140000/1135835/p387-jones.pdf?key1=1135835&key2=2431363811&coll=GUIDE&dl=GUIDE&CFID=27547799&CFTOKEN=99557576; pp. 387-396; WWW 2006, May 23-26, 2006, Edinburgh, Scotland.

Bienvenido Velez, et al., "Fast and Effective Query Refinement", http://delivery.acm.org/10.1145/260000/258528/p6-velez.pdf?key1=258528&key2=4181363811&coll=GUIDE&dl=GUIDE&CFID=23110696&CFTOKEN=83629968; pp. 6-15; SIGIR 97 Philadelphia, PA.

* cited by examiner

QUERY SUGGESTIONS FOR NO RESULT WEB SEARCHES

BACKGROUND

With the proliferation of the Internet and the World Wide Web (the "Web"), search engines have become an invaluable tool to locate information. A user can submit a request for information (commonly referred to as a "query") to a search engine, which then searches for web content related to the request. Search engines search for query terms, or combinations thereof, in content on the Web. When terms are found in web content, the web content is presented to the user in a results list.

A significant portion of user queries do not produce search results because web content containing the query terms cannot be found. These queries are commonly referred to as "no-result queries." No-result queries typically contain unique terms that have never or rarely been submitted to the search engine. Additionally, many no-result queries contain misspellings and are relatively large, making them too specific to produce results.

To make query results more accurate, modern search engines have become sophisticated enough to spell check query terms and recommend related query terms and phrases to guide the user. As a result, the user can refine a search-engine query to terms that more accurately reflect the user's intended request. Related query terms are typically generated by a search engine mapping a single query term to a set of query suggestions. Two common approaches are used to map query terms. In the first, common queries that contain the original query words are identified from search-engine log data, which includes historical data associated with other users' queries. In the second, search-engine log data is analyzed to determine how users, in aggregate, have historically refined their original queries. Both approaches, however, require common queries that have been submitted previously and appear in search-engine data logs. Consequently, these refinement techniques cannot be used to enhance no-results queries because no-results queries have typically not been previously submitted to the search engine, and therefore are not included within search-engine log data.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

One aspect of the present invention is directed to presenting one or more suggested search-engine queries based on an initial search-engine query. Once the initial query is received, a search engine determines whether any web content is relevant thereto. If not, a query-suggestion service determines whether any suggested queries can be substituted for the initial query. If not, the query is parsed into individual terms and spell-corrected, if necessary. Each parsed term is then checked to see whether it can be associated with alternative search terms. Terms than can are combined and their combination is also checked for alternative search terms. All of the alternative search terms are scored and then assembled into a list of suggested search terms that is presented to the user.

BRIEF DESCRIPTION OF THE SEVERAL VIEWS OF THE DRAWINGS

The present invention is described in detail below with reference to the attached drawing figures, wherein.

DETAILED DESCRIPTION

The subject matter described herein is presented with specificity to meet statutory requirements. However, the description herein is not intended to limit the scope of this patent. Rather, it is contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods, systems, and computer-storage media having computer-executable instructions embodied thereon that, when executed, perform methods in accordance with embodiments hereof, for providing a user with query terms that are likely to be related to the user's search intent when no results are returned from the user's initial query. In other words, embodiments described herein are directed to refining search terms submitted in a no-results query. Once a user submits a search query, the terms in the search query are corrected for typographical and spelling errors. Various software components determine whether any suggested queries related to the corrected search query currently exist. If so, the suggestions are returned to the user. If no suggested queries are located, the corrected query is then parsed into individual terms, and each parsed term is checked for any suggested terms associated therewith. Parsed terms associated with a suggestion term are combined, and the combined terms are then checked for suggested terms. Weighted values are assigned to each single or combined term that has an associated suggested term.

A software application is configured to apply an algorithm that scores the corrected terms of the search query—based, in part, on the suggested terms found—in order to determine the most likely suggested terms to present the user. The algorithm may incorporate various parameters to make such a determination. For example, a corrected term (or combined terms) may be scored based on the term or terms number of characters, number of words, strength associated with a suggested word, position within the original query, or other similar parameters. Embodiments are not limited to any particular parameters of algorithm, as one skilled in the art will appreciate that various schemes may be applied to score terms with suggestions.

Having briefly described a general overview of the embodiments described herein, an exemplary operating environment is described below.

Figure 1:
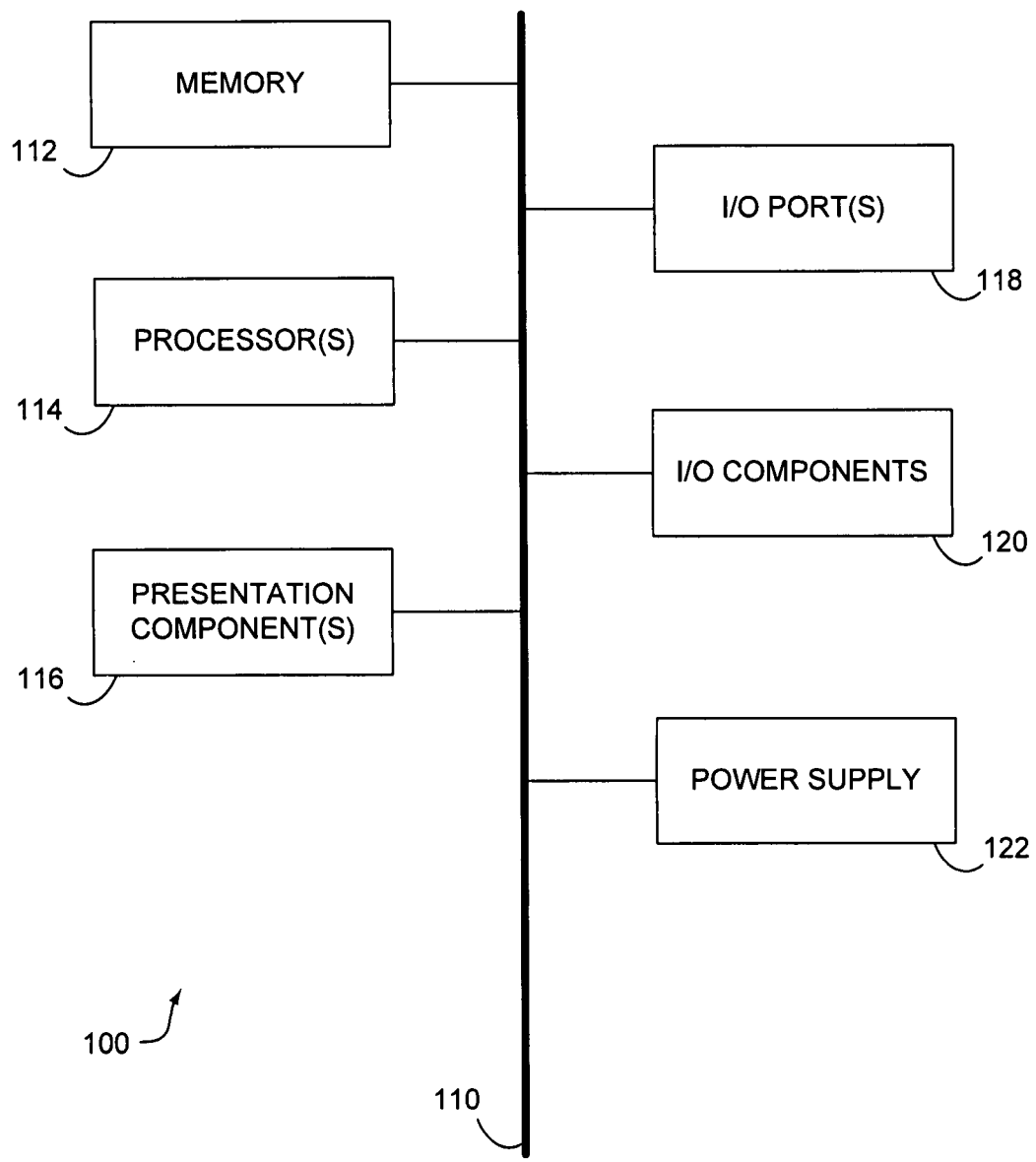
FIG. 1 is a block diagram of an exemplary computing environment suitable for use in implementing embodiments of the present invention.

Referring initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In one embodiment, computing device 100 is a personal computer. But in other embodiments, computing device 100 may be a cell phone, digital phone, handheld device, personal digital assistant ("PDA"), or other device capable of executing computer instructions.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an 1/0 component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
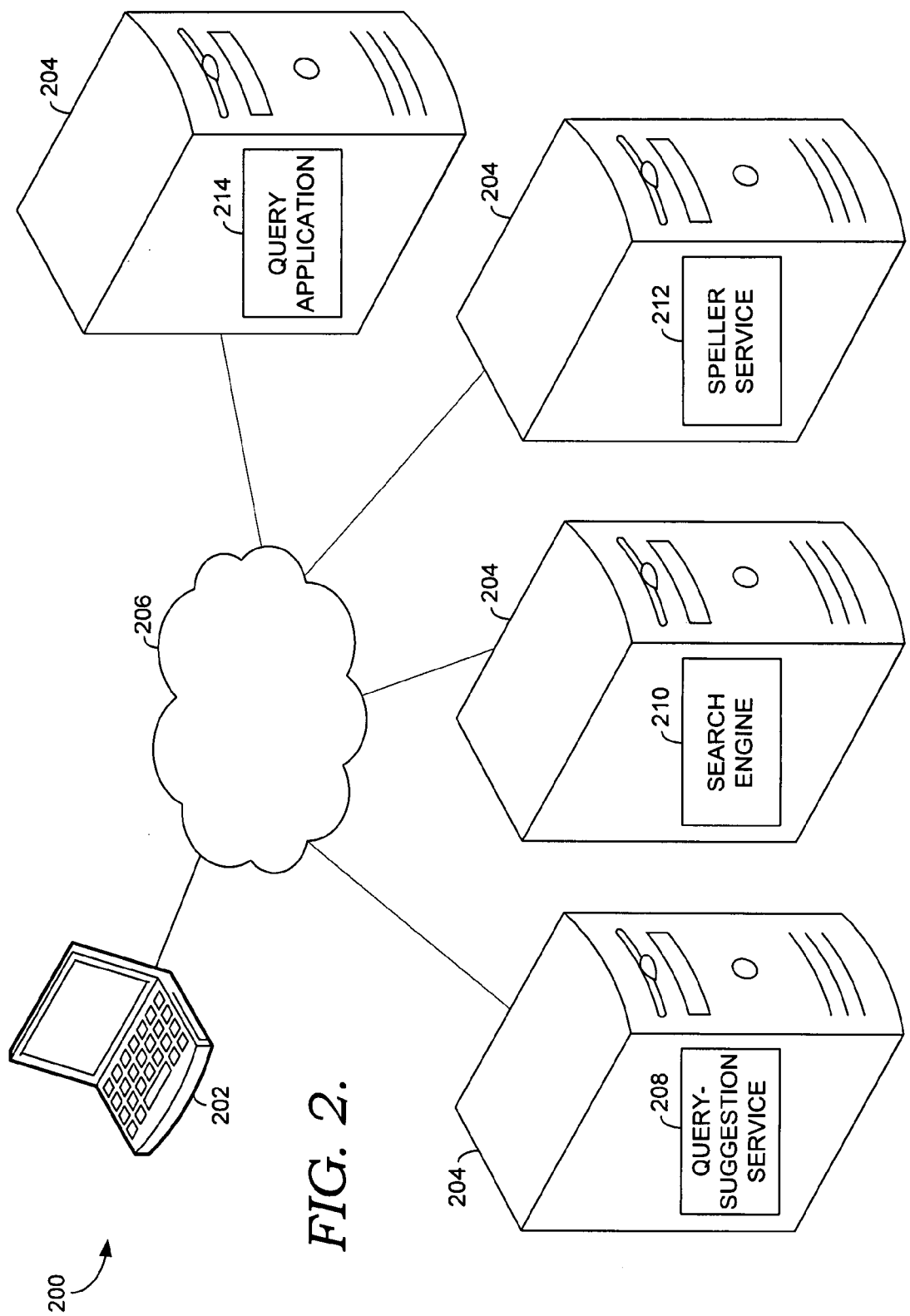
FIG. 2 is a block diagram of a system for determining query suggestions to present a user, according to an embodiment of the present invention.

Turning now to FIG. 2, a block diagram is illustrated, in accordance with an embodiment of the present invention, showing a no-results query-suggestion system 200 configured to determine one of more suggested terms to present to the user's initial search query. It will be understood and appreciated by those of ordinary skill in the art that the query-suggestion system 200 shown in FIG. 2 is merely an example of one suitable computing system environment and in intended to suggest any limitation to as to the scope of use or functionality of embodiments of the present invention. Neither should the query-suggestion system 200 be interpreted as having any dependency or requirement related to any single component, combination of components, computing device, or hardware illustrated therein. Further, the query-suggestion system 200 may be provided as a stand alone product, as part of a software development environment, or any combination thereof.

The query-suggestion system 200 includes a client computing device 202 and servers 204 that communicate with one another via network 206. Network 206 may include, without limitation, one or more local area networks (LANs) and/or wide area networks (WANs). Such networking environments are commonplace in offices, enterprise-wide computer networks, intranets, and the Internet. Accordingly, network 206 is not further described herein.

The client computing device 202 may be any type of computing device, such as device 100 described above with reference to FIG. 1. By way of example only and not limitation, the client computing device 202 may be a personal computer, desktop computer, laptop computer, handheld device, cellular phone, digital phone, PDA, or the like. It should be noted that the invention is not limited to implementation on any type of computing devices.

The servers 204 are configured to host and execute various software components, including, a query-suggestion service 208, a search engine 210, a speller service 212, and a query application 214. One skilled in the art will understand that each of the servers 204 may in fact be a combination of an application server, database server, and/or file server in communication and configurable to support the components described herein. In addition, the servers 204 may be dedicated or shared servers.

Components of server 204 (not shown for clarity) may include, without limitation, a processing unit, internal system memory, and a suitable system bus for coupling various system components, including one or more databases for storing information (e.g., files and metadata associated therewith). Each server typically includes, or has access to, a variety of computer-readable media. By way of example, and not limitation, computer-readable media may include computer-storage media and communication media. In general, communication media enables each server to exchange data via network 206. More specifically, communication media may embody computer-readable instructions, data structures, program components, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

While the query suggestion service 208, the search engine 210, the speller service 212, and the query application 214 are illustrated in FIG. 2 as being hosted on separate servers 204, embodiments are not limited to such a one-to-one component-to-server configuration. Rather, in some embodiments, multiple components are hosted on a single server 204. By way of example only without limitation, one server 204 may be configured to support the query-suggestion service 208 and the speller service 212. In another example, the query application 214 and the search engine 210 may be hosted in the same server 204. Furthermore, one skilled in the art will appreciate that each of the servers 204 may actually comprise several interconnected servers. For example, the server 204 hosting the search engine 210 may, in actuality, comprise 100 different servers in communication. The single unit depictions are meant for clarity, not to limit the scope embodiments in any form.

In one embodiment, the query-suggestion service 208 and the speller service 212 are web services that are accessible to the other components in FIG. 2 via network 206. Communication with the query-suggestion service 208 and the speller service 212 can be accomplished by sending computer-executable messages using various standard protocols. For example, a request for information from the speller service 212 may be communicated as an Extensible Markup Language ("XML") message sent within a Service Oriented Architecture Protocol ("SOAP") envelope using the hypertext transfer protocol ("HTTP") or secure-HTTP ("HTTPS"). One skilled in the art will appreciate that numerous other languages and protocols may alternatively be employed to communicate information to and from the query-suggestion service 208 and the speller service 212.

The query-suggestion service 208 is configured, in one embodiment, to receive requests for suggested terms relevant to a specific term or a combination of terms. For example, a request to locate suggested terms associated with the term "Romeo" may be sent to the query-suggestion service 208, which is configured to determine whether any suggested terms have been associated with the term.

One skilled in the art will appreciate that various software implementations and techniques may be used to produce query suggestions for a user query. In one embodiment, a front-end server (not illustrated in FIG. 2 for clarity) may be configured to receive portions of search-engine queries submitted by a user at the client computing device 202. Portions of queries may include an entire search-engine query as well as any percentage of query. For example, if the search query that a user intends to submit is "Romeo and Juliet," the full completed query of "Romeo" could represent the entire query. In the same example, the incomplete queries "Rom" and "Romeo and" of the intended query could represent a portion of the intended query. In embodiment, a portion of a search query may also include errors such as misspellings of intended search queries.

The front-end server may additionally be configured to execute a query autocomplete task. In an embodiment, query autocomplete is a feature that can suggest, on-the-fly, a list of most likely search queries that complete the currently typed-in portion of a search query as the user types in the portion of the query. For example, if a user types in "co" in a search box, a list containing "computers," "coffee," and "condos" may be suggested.

The query suggestion service 208 may be configured to receive at least a portion of a submitted query and compare the portion to a repository of suggested terms stored on the server 204, in one embodiment, in order to determine the search query that the user intends to submit. The repository may be configured to store one or more suggested search queries. In an embodiment, the repository may be a query log, wherein the query log may be configured to track all search queries submitted by users. Once the query suggestion service 208 compares at least a portion of a submitted query, the query suggestion service 208 can be configured to identify the most relevant suggested search queries related to the portion. In an embodiment, the submitted portion may produce suggested search queries that begin with the same characters as the portion. For example, if a user types in "co" in a search box, a list containing "computers," "coffee," and "condos" may be suggested. In another embodiment, the portion may initiate a list of suggested search queries that begin with different characters as the submitted portion. For example, if a user types "windows" in a search box, a list containing "Microsoft Windows" and "Anderson Windows" may be suggested.

In an embodiment, the repository stores the suggested search queries in a ranked order. The ranked order can be used to determine the most relevant suggested search queries that are related to at least a portion of a submitted query. Any algorithm may be used to determine the ranked order. The ranked order may be based on, for example, popularity. In an embodiment, popularity can be determined by the frequency in which users submit a completed search query, wherein the greater the frequency, the more popular the search query is judged to be. For example, for the submitted portion of a search query such as "com," if the term "computer" is more popular (has a greater frequency of usage) than the term "comedy," then "computer" will be ranked higher than "comedy." In another embodiment, the suggested search queries may be ranked alphabetically.

The query suggestion service 208 may be configured to identify any number of suggested search queries as determined by the ranked order. For example, the query suggestion service 208 can identify the top ten suggested queries.

The query suggestion service 208 may also communicate with a backend server (not shown for clarity), which is configured to receive the suggested search queries as determined by the front-end server discussed above. Predetermined search results may be stored and indexed. In an embodiment, the stored search results are considered "predetermined" because the search results are pre-fetched using the suggested search queries stored in the above-described repository. In an embodiment, pre-fetching the predetermined search results may include taking the suggested search queries stored in the repository and running them through the search engine 210 in order to determine the relevant search results. Once the relevant search results have been determined, they can be considered to be predetermined search results and may be associated with their corresponding suggested search query. The associated predetermined search results and suggested search query may be stored together. In another embodiment, the backend server does not use the query results; as such, the search results are not predetermined. In such an embodiment, the backend server can determine search results on-the-fly as it receives a number of suggested search results related to a portion of a search query submitted by a user.

In an embodiment, the predetermined search results may be associated in a ranked order with the corresponding suggested search query. Any type of algorithm may be employed to determine ranking order. The ranked order can be based on, for example, popularity of the search results. In an embodiment, popularity can be determined by the frequency with which users access each search result on the Internet.

When a number of suggested search queries is received, the backend server can be configured to compare the suggested search queries to the stored query results in order to identify and provide one or more predetermined search results for each suggested search query. If there is more than one predetermined search result for a suggested search query, the backend server may be configured to provide any number of predetermined search results. For example, the backend server may be configured to provide five predetermined search results. In an embodiment, the predetermined search results are provided in a ranked order.

The speller service 212 is configured to receive terms in the submitted to the search engine 210 by the user and check them for alternative spellings or typographical errors. Once these errors or misspellings are detected, the speller service 212, in one embodiment, locates the most likely terms that the user meant to submit and returns those terms. As one skilled in the art will understand, the most likely terms can be determined by querying a database (not shown for clarity) of historically incorrect spellings and typographical errors associated with search terms. Additionally, a list of most likely terms may be selected in the database, and the list itself may be queried based on a specific parameter, e.g., the frequency that a corrected term is selected by other users who have submitted queries with similar query terms. For example, if a user submits a query with the terms "Balcony sceen of Romeo and Juliet," the speller service 212 is configured to query a database for corrected terms associated with "sceen." If two corrected terms are listed (e.g., "scene" and "seen"), the speller service 212 may select the term "scene" because it was chosen the more frequently by users when the misspelled term was in a query with "Romeo and Juliet." The spell checker 212 is not limited, however, to any particular parameter or configuration, as one skilled in the art will appreciate that similar error-checking services are well known.

The query application 214 is a software component configured to determine whether a no-results query has been submitted by the user and, if so, determine a list of suggested search terms to present the user. In operation, the query application 214 receives a search-engine query submitted by the user. The query application 214 transmits the submitted query to the query-suggestion service 208, the search engine 210, and the speller service 212. The search engine 210 attempts to locate web content related to the search query. If web content is located, the search engine 210, in one embodiment, transmits the web content to the query application 214. Additionally, the query application 214 receives any spelling or typographical suggestions related to the query from the speller service 212 as well as any query suggestions determined by the query-suggestion service 208. All three (i.e., the web content, spelling and typographical suggestions, and query suggestions) are then transmitted by the query application 214 to the client computing device 202 for presentation to the user.

If, however, the search engine 210 does not locate any web content, the query application 214 is configured to transmit the user's query to the query-suggestion service 208. If the speller service 212 identifies any spelling or typographical errors, the query application 214 corrects the query according to the suggestions made by the speller service 212, then sends the corrected query to the query-suggestion service 208. Whichever query is sent, the query-suggestion service 208, in one embodiment, first determines whether the entire query triggers any query suggestions. If so, the query suggestions are transmitted to the query application 214, which passes them to the client computing device 202 for presentation to the user. But if the query-suggestion service 208 does not locate any query suggestions, the query application 214 is configured to parse the initial query (if the speller service 212 has not made any corrections) or the corrected query (if changes are made) into individual terms and apply an algorithm to determine suggested search terms to return to the user.

The applied algorithm computes the most likely query suggestions based on query suggestions, if any, for each individual term. To do so, the query application 214 passes the initial query (or the corrected query, if applicable) to the query-suggestion service 208. The query-suggestion service 208 first parses the query into individual terms and then checks each parsed term to see whether any trigger query suggestions. The query application 214 is notified by the query-suggestion service 208 of any parsed terms that did trigger query suggestions. The query application 214, in one, embodiment, then combines parsed terms that triggered query suggestions and sends the combinations of parsed terms to the query-suggestion service 208, which determines whether any of the parsed terms trigger query suggestions. This process is repeated, in some embodiments, until no combinations or terms trigger any query suggestions.

In one embodiment, the algorithm scores each query suggestion returned from the query-suggestion service 208 in order to determine which query suggestion to present the user. The scoring may be influenced by the length of the parsed term or combination of terms associated with a given query suggestion. For example, a query suggestion for the term "Romeo" may have a lower assigned score than a query suggestion associated with "Romeo and Juliet," because the latter has more characters than the former. One skilled in the art will understand that numerous other ways exist for scoring query suggestions, and embodiment described herein are not limited to any particular method. For example, query suggestions for capitalized words or proper nouns may be given added weight than those submitted for lower case words. Or the location of a parsed term in the initial query may also influence scoring—e.g., terms parsed from the end of the user's query may be weighted lower than those from the front.

In addition, the algorithm may include other factors when scoring returned query suggestions. Values associated with the actual query suggestions may be considered, in some embodiments. For example, the frequency that users have historically associated a parsed term with a given query suggestion may be given a value. Or, the relevancy of the query suggestion to the geographic location of the user—as determined by the user's Internet protocol (IP) address—may be assigned a value. Such a value would be advantageous when considering query suggestions from different locations or across different language barriers.

Moreover, the algorithm may use an arbitrary value set by an administrator that can be used to apply more deference to values associated with the query suggestions or the query terms. Perhaps this point is best illustrated in the following formula.

$$\text{Score}=\lambda(\text{value of parsed term})+\text{value of query suggestion}$$

In the above formula, the arbitrary value ($\lambda$) can be set to increase or decrease the weight assigned to the parsed term or the query suggestion. The Score can be used by the query application 214 to determine which query suggestions to assemble into suggestion for the user. For example, only the query suggestions with the highest Scores for each parsed term will be aggregated into a possible suggestion to the user. Along the same lines, the query suggestions with the second highest Scores will be assembled as the second suggestion to the user. Scores for each suggestion to the user are aggregated, in some embodiments, and the top aggregate scores are eventually presented to the user.

Figure 3:
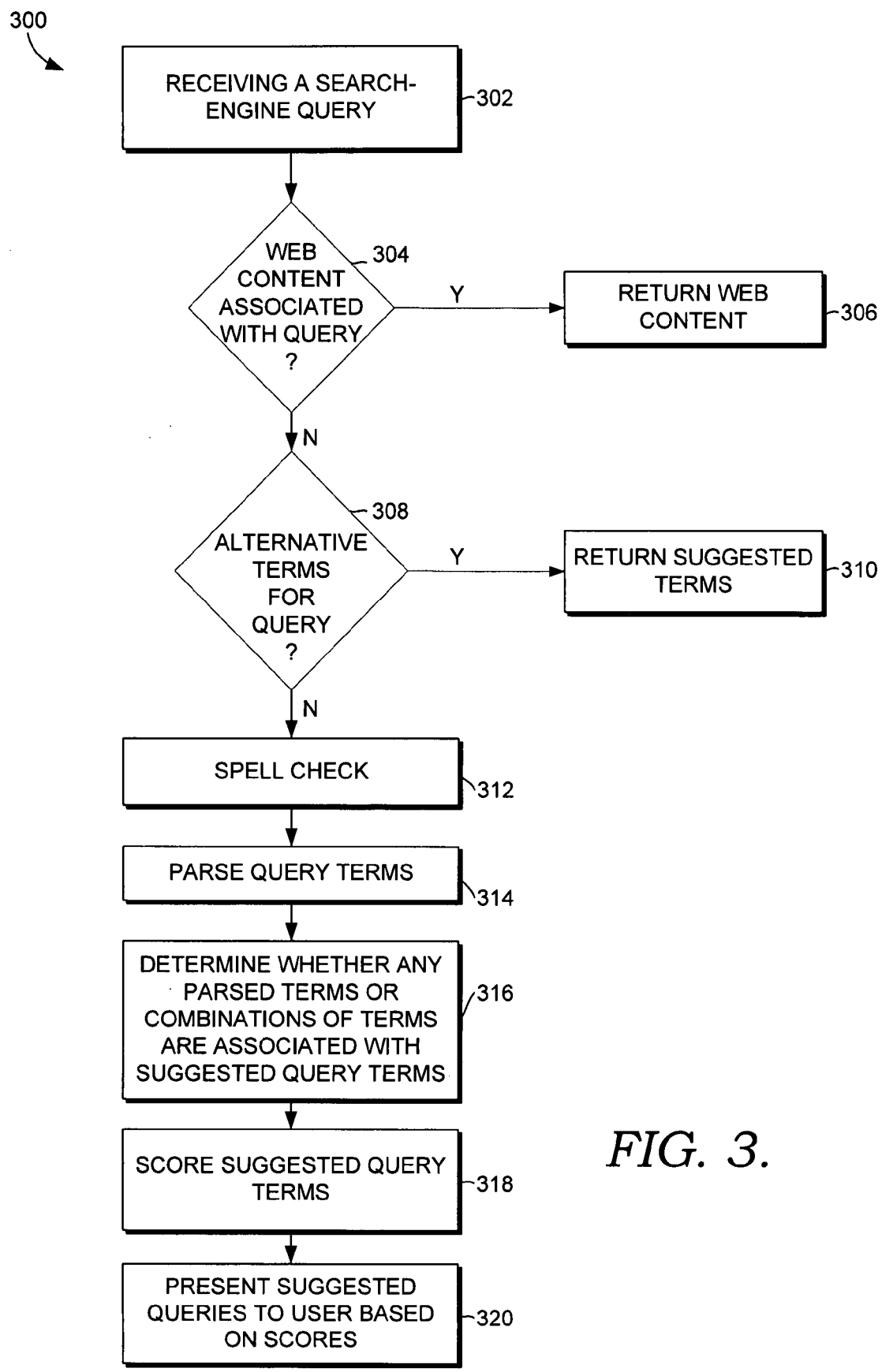
FIG. 3 is a flow diagram showing a method for determining query suggestions to present a user, according to an embodiment of the present invention.

Turing now to FIG. 3, a flow diagram is illustrated showing a method 300 for determining query suggestions to present a user, according to an embodiment of the present invention. FIG. 3 is meant purely for illustrative purposes and should not be construed to limit embodiments claimed or described herein. Initially, a search engine query is received, as indicated at 302, from a user on a computing device. Once received, a search engine determines whether any web content is associated with the query, as indicated at 304. If so, the web content is returned to the user, as indicated at 306. If not, however, the entire query is checked by a web service (such as the query-suggestion service 208) to determine whether any alternative terms are associated with the query, as indicated at 308.

If alternative terms are located, the suggested terms are returned and eventually presented to the user, as indicated at 310. On the contrary, if no terms are located, the user's query is checked for misspelled and typographical errors, as indicated at 312. If errors are detected in the query, a second check is performed using the corrected query to see if suggestions exist. If not, the query is parsed into multiple query terms, as indicated at 314. The parsed terms are sent back to the query suggestion service, which determines whether any parsed terms or combinations of terms are associated with suggested query terms, as indicated at 316. If a parsed term is associated with a suggested query term, it is then combined with other parsed terms that have suggested query terms, and the combination is checked again for suggested query terms.

Suggested query terms and combinations of query terms are scored according using any of the scoring techniques described herein. The resultant scores are used to assemble one or more suggested queries, which are ranked according to an aggregate score and presented to the user. In some embodiments, only the highest ranked query suggestions are presented to the user.

Figure 4:
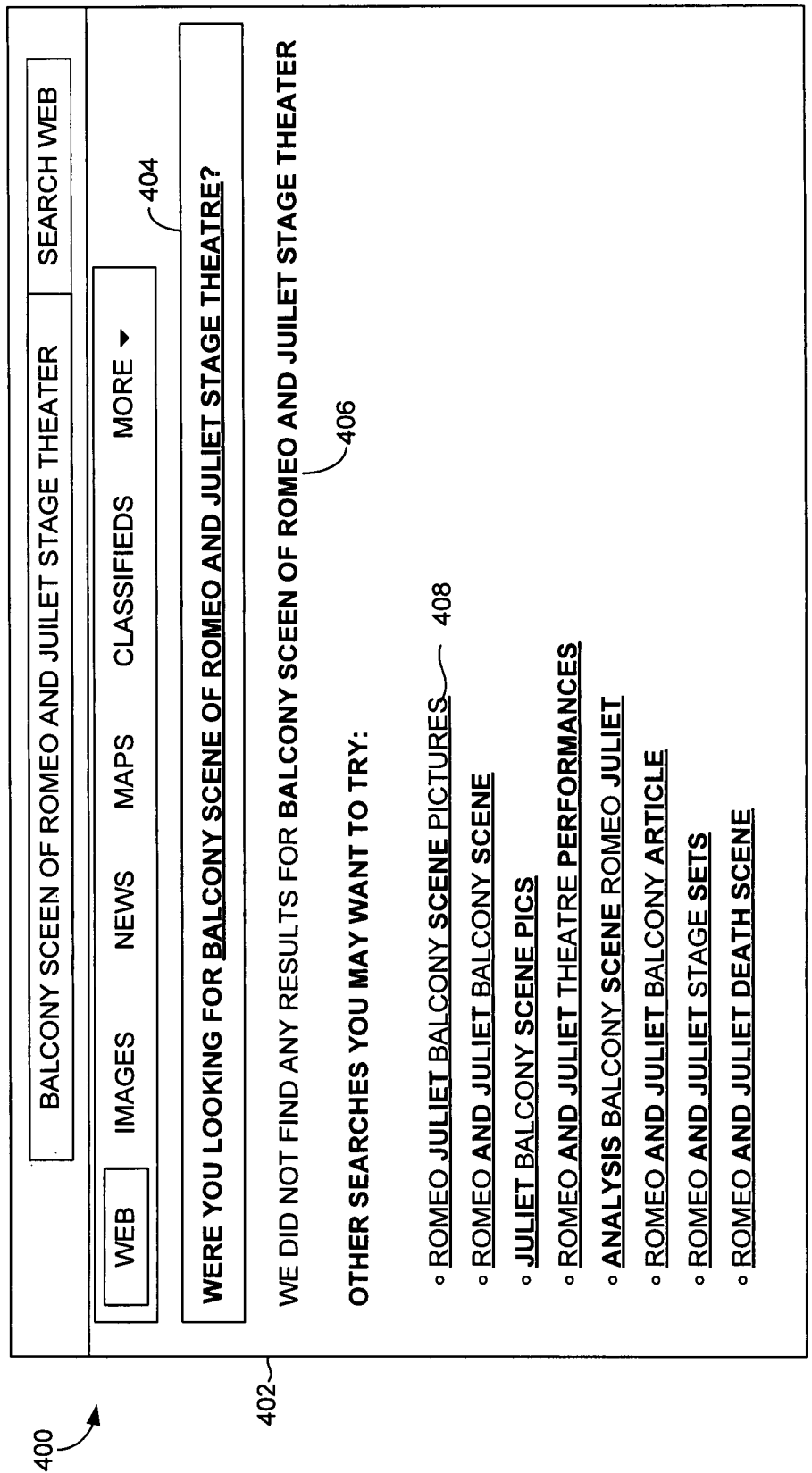
FIG. 4 is a graphical user interface depicting an exemplary web browser with query suggestions, according to an embodiment of the present invention.

FIG. 4 is a graphical user interface 400 depicting an exemplary web browser 402 with query suggestions, according to an embodiment of the present invention. FIG. 4 is provided solely for explanatory purposes and does not limit any user interface that presents the query suggestions described herein. The web browser 402 illustrates a search-results page for a search engine after a user submitted a query for "BALCONY SCEEN OF ROMEO AND JUILET STAGE THEATER." After no web content results were located, the query was spell-checked, and parsed into individual words. The corrected query used to locate query suggestions is presented in portion 404. A list of suggested queries 408 were determined by the techniques described herein and presented in a list.

The present invention has been described herein in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. One or more computer storage media storing computer-executable instructions that, when executed by a computing device, perform steps to present one or more suggested search-engine queries based on a single search-engine query, the steps comprising:
   receiving the single search-engine query, the single search-engine query comprising a plurality of terms;
   upon determining that no search results are associated with the single search-engine query:
   parsing the plurality of terms of the single search-engine query into individual parsed terms, each individual parsed term being identical to a term in the single search-engine query;
   for each of the individual parsed terms, identifying one or more suggested queries that are associated with the individual parsed term, wherein the one or more suggested queries contain terms identical to a term of the plurality of terms in the single search-engine query;
   forming a plurality of combinations of the individual parsed terms for which one or more suggested queries were identified, the combinations including at least two individual parsed terms, wherein each individual parsed term of the plurality of combinations is identical to a term in the single search-engine query;
   for each of the plurality of combinations, identifying one or more suggested queries associated with the combination, wherein the one or more suggested queries contain terms identical to terms of the plurality of terms in the single search-engine query;
   scoring (1) each of the one or more suggested queries identified for each of the individual parsed terms and (2) each of the one or more suggested queries identified for each of the plurality of combinations, wherein the scoring is based at least in part on a frequency that users have historically associated the respective individual parsed term or the combination of the individual parsed terms with each of the corresponding one or more suggested queries; and
   identifying a subset of the scored suggested queries as highly scored suggested queries; and
   providing the highly scored suggested queries as alternatives to the single search-engine query, wherein the provided highly scored suggested queries are associated with web content that relates to the single search-engine query.

2. The media of claim 1, wherein the scoring is based at least in part on a geographic location of a user such that suggested queries determined to be more common in the user's geographic location are scored higher than suggested queries determined to be uncommon in the user's geographic location.

3. The media of claim 1, wherein the scoring is based at least in part on a number of characters in the corresponding individual parsed term or the combination used to identify the one or more suggested queries such that a suggested query identified for a first individual parsed term is scored lower than a suggested query identified for a combination that includes the first individual parsed term and a second individual parsed term.

4. The media of claim 1 wherein the scoring is based at least in part on a position in the single search-engine query of the corresponding individual parsed term or the positions of the individual parsed terms included in the combination used to identify the one or more suggested queries.

5. The media of claim 1 wherein the one or more suggested queries identified for the individual parsed terms that are capitalized are scored higher than the one or more suggested queries identified for the individual parsed terms that are lowercase, and wherein the one or more additional suggested queries identified for the combinations of individual parsed terms that contain a capitalized individual parsed term are scored higher than the one or more additional suggested queries identified for the combinations of individual parsed terms that do not contain a capitalized individual parsed term.

6. One or more computer storage media storing computer-executable instructions that, when executed by a computing device, perform steps to present one or more suggested search-engine queries based on a single search-engine query, the steps comprising:
- receiving the single search-engine query, the single search-engine query comprising a plurality of terms;
- parsing the plurality of terms into three or more individual parsed terms, each parsed term of the three or more individual parsed terms being identical to a term in the single search-engine query;
- receiving one or more suggested queries associated with the each parsed term of the three or more individual parsed terms, wherein the one or more suggested queries contain terms identical to a term of the plurality of terms in the single search-engine query;
- forming a plurality of combinations of the three or more individual parsed terms for which the one or more suggested queries were received, each combination including at least two parsed terms, wherein each parsed term of the plurality of combinations is identical to a term in the single search-engine query;
- receiving one or more additional suggested queries associated with one or more of the plurality of combinations of the three or more individual parsed terms wherein the one or more additional suggested queries contain terms identical to terms of the plurality of terms in the single search-engine query;
- assigning a score to each of the one or more suggested queries and to each of the one or more additional suggested queries, wherein the scoring is based at least in part on a frequency that users have historically associated the respective individual parsed term or the combination of the individual parsed terms with each of the corresponding one or more suggested queries and each of the corresponding one or more additional suggested queries respectively;
- selecting, as suggested alternative search-engine queries to provide to a user, a subset of the one or more suggested queries and a subset of the one or more additional suggested queries determined to have been assigned a high score; and
- providing the suggested alternative search-engine queries, wherein the provided suggested alternative search-engine queries are associated with web content that relates to the single search-engine query.

7. The media of claim 6, wherein the assigned score for the each of the one or more suggested queries and the each of the one or more additional suggested queries is further based at least in part on a number of characters in the corresponding parsed term or the combination of parsed terms such that a query suggestion identified for a first parsed term is scored lower than a query suggestion identified for a combination of parsed terms that includes the first parsed term and a second parsed term.

8. The media of claim 6, wherein the assigned score for the each of the one or more suggested queries and the each of the one or more additional suggested queries is based at least in part, on a position in the initial search-engine query of the corresponding parsed term or positions of the parsed terms included in the combination.

9. One or more computer storage media storing computer-executable instructions that, when executed by a computing device, perform steps to present one or more suggested search-engine queries based on a received single search-engine query, the steps comprising:
- receiving the single search-engine query, the single search-engine query comprising a plurality of terms;
- determining that no search results are associated with the single search-engine query;
- upon determining that no search results are associated with the single search-engine query, determining that the single search-engine query does not contain spelling or typographical errors;
- upon determining that the single search-engine query does not contain spelling or typographical errors, deconstructing the plurality of terms into individual terms, each individual term of the plurality of terms being identical to a term in the single search-engine query;
- for each individual term of the plurality of terms, identifying one or more suggested queries that are associated with the each individual term, wherein the one or more suggested queries contain terms identical to a term of the plurality of terms in the single search-engine query;
- forming a plurality of combinations of the individual terms for which the one or more suggested queries were identified, wherein each individual term of the plurality of combinations is identical to a term in the single search-engine query;
- for each of the plurality of combinations, identifying one or more suggested queries associated with the combination, wherein the one or more suggested queries contain terms identical to terms of the plurality of terms in the single search-engine query;
- aggregating the one or more suggested queries arising from the individual terms and the one or more suggested queries arising from the combination of terms to form an aggregate set of suggested queries;
- scoring each suggested query within the aggregate set of suggested queries, wherein the scoring is based at least in part on a frequency that users have historically associated the respective individual parsed term or the combination of individual parsed terms with each of the corresponding one or more suggested queries;
- identifying a subset of the scored suggested queries as highly scored suggested queries; and
- providing the highly scored suggested queries as alternatives to the single search-engine query, wherein the provided highly scored suggested queries are associated with web content that relates to the single search-engine query.

* * * * *